United States Patent [19]

Eshelman et al.

[11] 4,242,914
[45] Jan. 6, 1981

[54] PRESSURE TRANSDUCER

[75] Inventors: Robert W. Eshelman; Robert P. Benjey, both of Ann Arbor, Mich.

[73] Assignee: Chrysler Corporation, Highland Park, Mich.

[21] Appl. No.: 49,522

[22] Filed: Jun. 18, 1979

[51] Int. Cl.³ .............................................. G01L 9/10
[52] U.S. Cl. ...................................... 73/711; 336/30; 73/728
[58] Field of Search ................. 73/711, 708, 722, 728; 336/30

[56] References Cited

U.S. PATENT DOCUMENTS

| | | | |
|---|---|---|---|
| 2,194,624 | 3/1940 | Titterington | 73/708 |
| 3,382,470 | 5/1968 | Kvistad | 336/30 |
| 3,910,106 | 10/1975 | Brady | 73/708 |
| 4,030,365 | 6/1977 | Phillips et al. | 73/708 |
| 4,060,714 | 11/1977 | Lappington | 364/431 |

Primary Examiner—Donald O. Woodiel
Attorney, Agent, or Firm—Newtson & Dundas

[57] ABSTRACT

A pressure transducer comprises a bellows as the pressure sensing element and a variable inductance coil whose inductance is made to vary as a function of pressure sensed by the bellows. Motion is transmitted between the bellows and a plunger associated with the coil by means of a bent lever mechanism. The mechanical advantage of the bent lever is adjustable, after assembly of the transducer, to set the span to a desired value.

7 Claims, 14 Drawing Figures

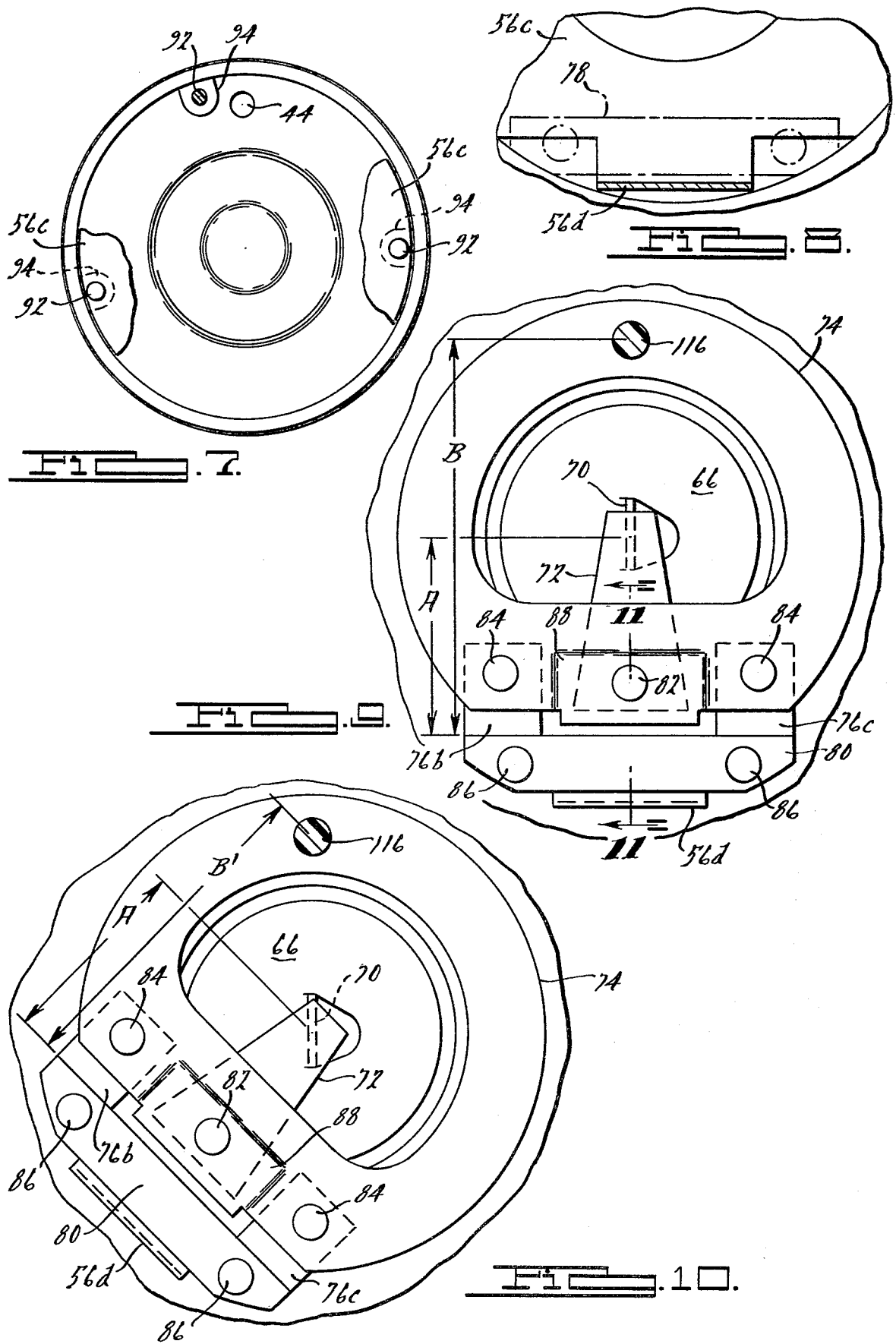

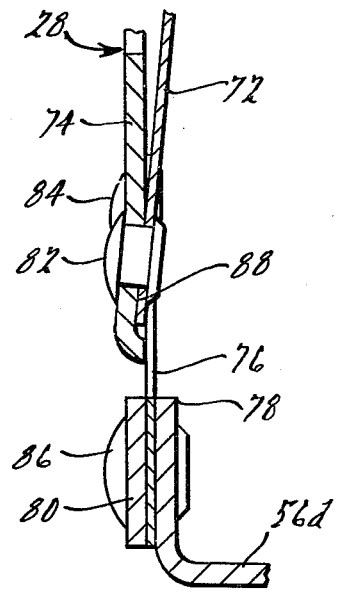
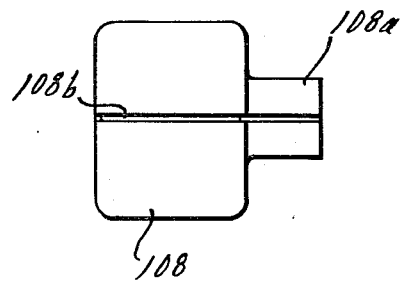
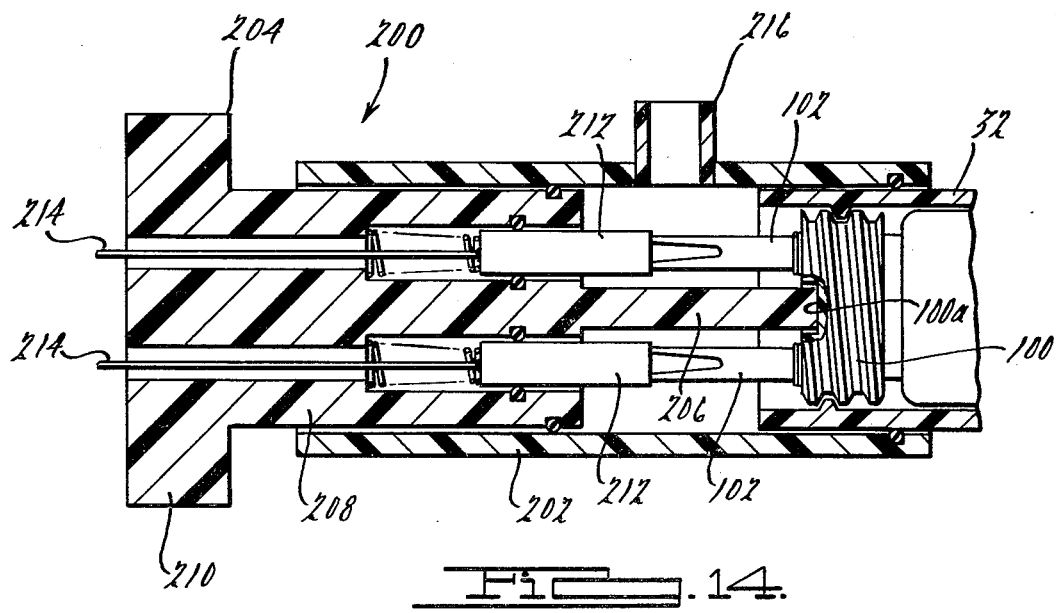

PRESSURE TRANSDUCER

BACKGROUND AND SUMMARY OF THE INVENTION

This invention pertains to pressure transducers and particularly to a pressure transducer useful as a manifold absolute pressure sensor (commonly called a MAP sensor) in conjunction with an electronic engine control system for an automobile engine.

As part of the effort toward compliance with governmentally mandated exhaust emissions standards and fuel economy performance standards, electronic control systems have been introduced in recent years on automotive internal combustion engines. These control systems are used for such control functions as spark timing or fuel management and comprise sensors for sensing various operating parameters (such as manifold vacuum, engine temperature, engine speed, etc.) and supplying corresponding input signals to electronic controls which in turn process these signals to develop output signals performing the desired control functions. The electronics technology for these applications has advanced to a point where it is now advantageous to use digital microprocessor-based systems on a mass-production basis for engine control functions. However it is generally fair to say that sensor development has not kept pace with the rapid acceleration in electronics technology. The problem lies not in a lack of any sensors at all, but rather in that development of cost-effective sensors has considerably lagged the progress of cost-effectiveness of microprocessor-based electronics.

A pressure transducer is one type of sensor which is useful in an engine control system. An example is a MAP sensor which senses manifold absolute pressure and provides a corresponding output signal. Many known types of absolute pressure transducers are relatively expensive and inherently sensitive to ambient temperature, such temperature sensitivity generally being caused by the sensitivity of the basic pressure sensing element. For this reason, among others, such transducers are not suited for automotive engine control applications. Typically, such absolute pressure transducers contain capacitive capsules, silicon or germanium strain gauges on or with pressure sensing diaphragms, or multiple coil pickups which are relatively expensive to manufacture. Furthermore, these devices tend to have fixed internal transfer characteristics such as capacitance versus pressure, resistance versus pressure, or peak-to-peak voltage versus pressure, and generally require electronic compensation internal of the transducer to calibrate the slope and offset during manufacturing.

The present invention, in its broadest aspect, relates to an improved pressure transducer well suited for mass-production usage and in the preferred embodiment is disclosed as an absolute pressure transducer for use as a MAP sensor. The principles of the present invention provide a means for overcoming the inherent disadvantages of prior transducers, as described above. The transducer of the present invention can be used to advantage when connected in an electronic circuit of the type shown in U.S. Pat. No. 4,060,714 to perform an analog to digital conversion of absolute pressure. A transducer embodying principles of the present invention requires only a single inductance coil which is relatively inexpensive to produce. No internal compensating electronics are required. A metal shield surrounding the coil attenuates sensitivity to external magnetic fields and increases gain. Such reduced sensitivity and increased inductance change allow the output of the transducer to be fed directly to a circuit such as described in the foregoing patent without signal processing internal to the transducer. This decreases the overall system cost by allowing all electronic components to be integrated into the microelectronics itself. It also reduces the number of sources of signal conversion inaccuracies because of the reduction in the number of interconnected components. By selecting the transducer characteristics to optimize accuracy and stability, the sensitivity to structural deflections within the transducer is decreased, permitting lower cost materials to be used in construction. It also makes the calibration simpler. The transducer provides improved adjustment to set both transducer absolute inductance (i.e. offset) and total inductance change (i.e., slope or span) after the transducer has been fully assembled. Internal mechanical temperature compensation is provided to compensate for mechanical changes in the structural and sensing elements within the transducer. External resistance values can be chosen to minimize temperature effects of coil resistance if the associated circuits are susceptible to resistance variations in the inductance coils.

The foregoing features, advantages and benefits of the invention, along with additional ones, will be seen in the ensuing description and claims which should be considered in conjunction with the accompanying drawings. The drawings disclose a preferred embodiment of the present invention according to the best mode presently contemplated in carrying out the invention.

BRIEF DESCRIPTION OF THE DRAWINGS

FIG. 7 is a sectional view, slightly reduced, having portions broken away and taken in the direction of arrows 7—7 in FIG. 1.

FIG. 8 is a fragmentary sectional view taken substantially in the direction of arrows 8—8 in FIG. 1 and slightly enlarged.

FIG. 9 is a fragmentary sectional view taken in the direction of arrows 9—9 in FIG. 1 and slightly enlarged.

FIG. 10 is a view similar to FIG. 9 showing a different position.

FIG. 11 is a fragmentary sectional view taken in the direction of arrows 11—11 in FIG. 9 and enlarged.

FIG. 13, is a longitudinal view of one of the component parts of the transducer shown by itself.

FIG. 14 is a longitudinal sectional view, with portions broken away, of the transducer and a calibration tool illustrating a portion of the calibration procedure.

DESCRIPTION OF THE PREFERRED EMBODIMENT

Figure 1:
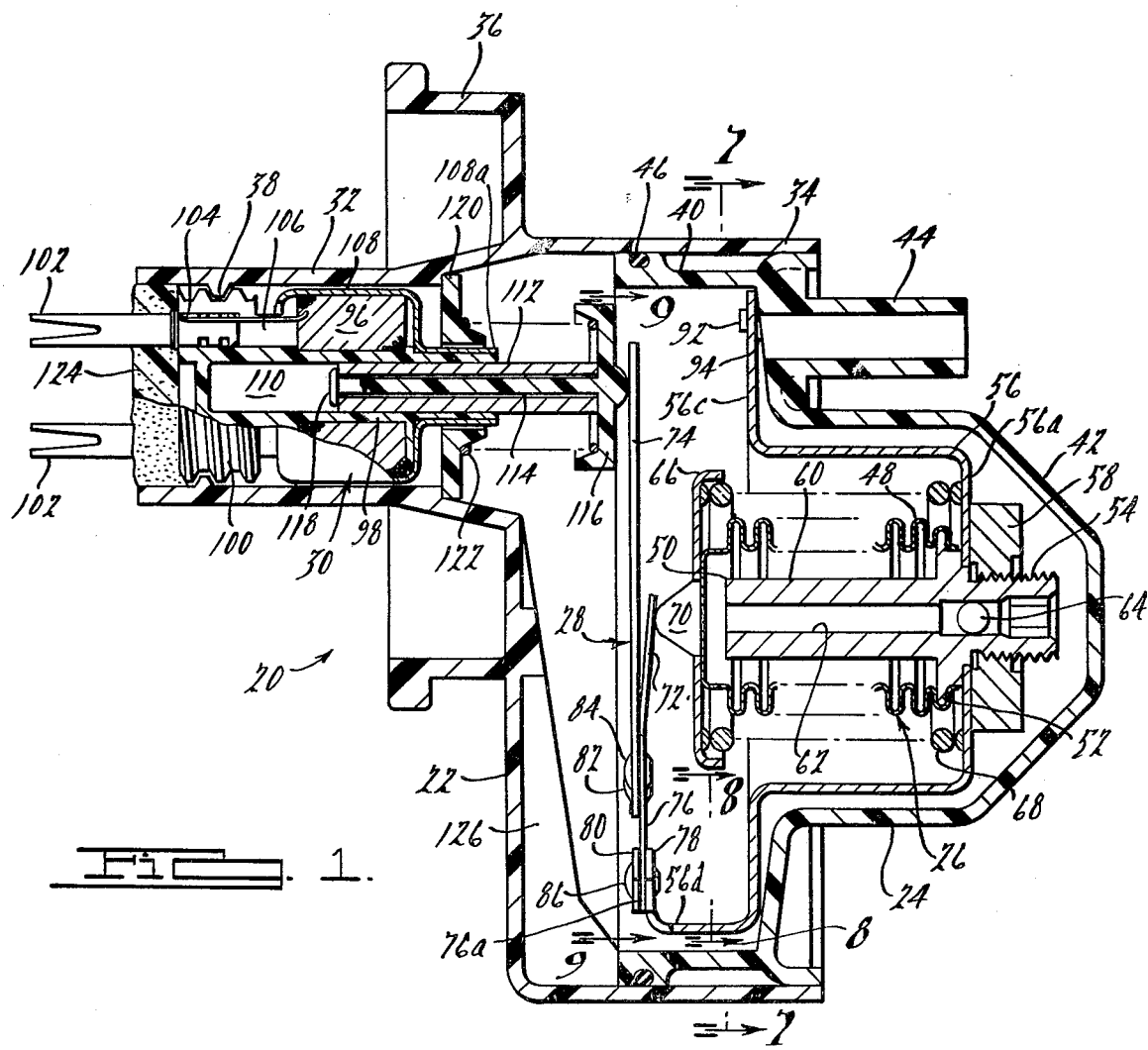
FIG. 1 is a front longitudinal sectional view through a pressure transducer embodying principles of the present invention.

FIG. 1 illustrates a preferred embodiment of pressure transducer 20 embodying principles of the present invention. Pressure transducer 20 comprises a housing consisting of two housing elements 22 and 24, a pressure responsive device 26, a bent lever mechanism 28 and a variable inductor 30. Briefly, pressure being sensed is communicated to the interior of the transducer with pressure responsive device 26 providing longitudinal motion in response to sensed pressure variations and inductor 30 a corresponding electrical output signal. Motion between the device and inductor is transmitted by means of bent lever mechanism 28.

Figure 2:
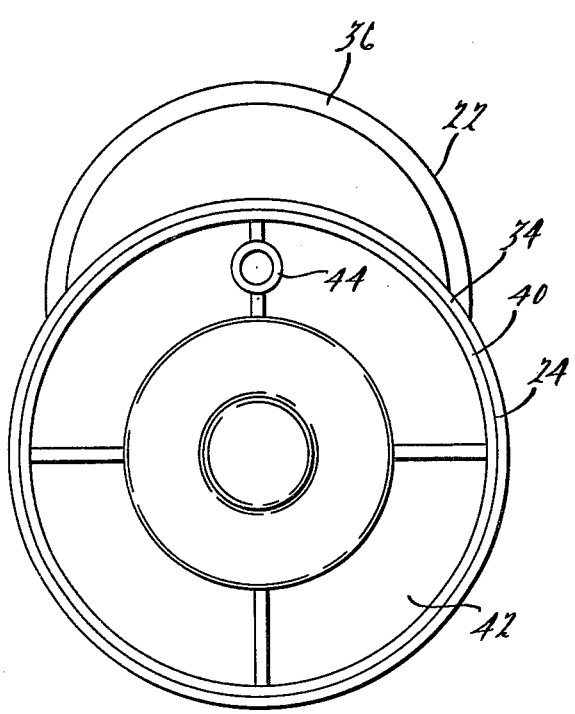
FIG. 2 is a right side elevational view, on a slightly reduced scale, of the pressure transducer of FIG. 1.
Figure 3:
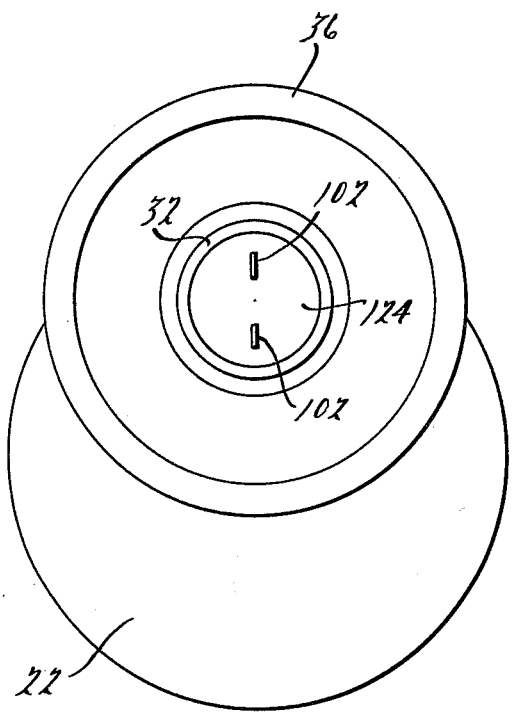
FIG. 3 is a left side elevational view, on a slightly reduced scale, of the pressure transducer of FIG. 1.
Figure 4:
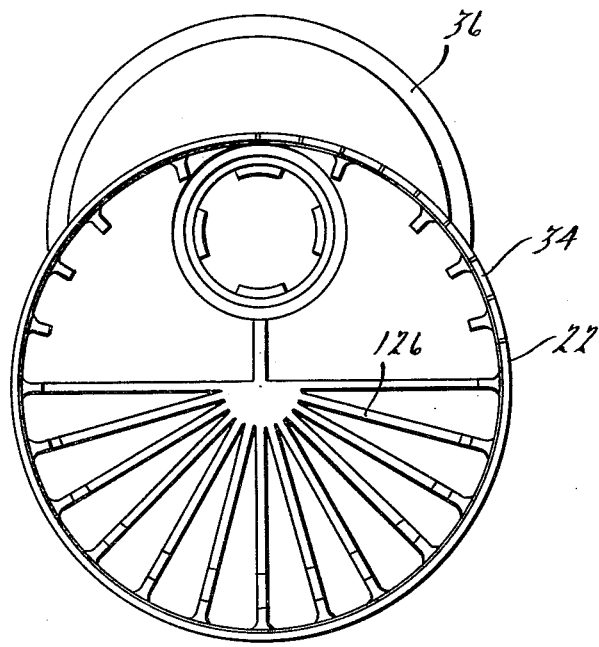
FIG. 4 is an end view of one of the elements of the transducer of FIG. 1 shown by itself.
Figure 5:
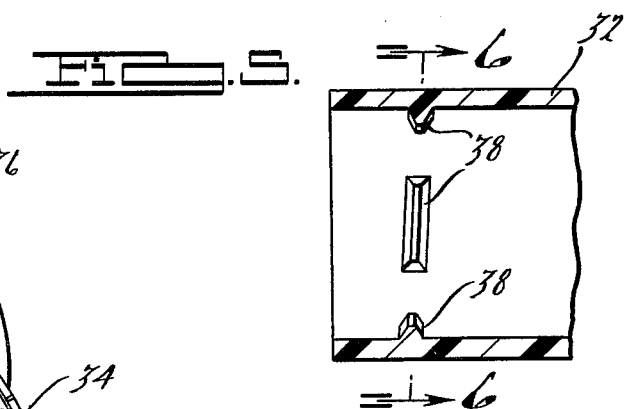
FIG. 5 is a fragmentary sectional view, slightly enlarged, of a portion of the element of FIG. 4.
Figure 6:
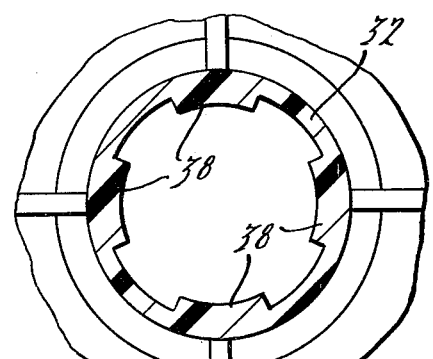
FIG. 6 is a sectional view taken substantially in the direction of arrows 6—6 of FIG. 5.

Housing element 22 (the left hand element as viewed in FIG. 1) comprises a small circular cylindrically walled bore section 32 adjoining on its right a larger circular cylindrically walled bore section 34. A circular mounting flange 36 is disposed around the outside of housing element 22 where the two bore sections 32, 34 adjoin. Further details of housing element 22 can be seen in FIGS. 2 through 6 where FIGS. 2 and 3 show the transducer in its entirety and FIGS. 4, 5 and 6 show selected views of housing element 22 by itself. It will be noted that the longitudinal axes of the two bore sections 32, 34 are eccentric. The interior of housing element 22, by itself, is enclosed except for the left-hand end of bore section 32 and the right hand end of bore section 34 being open. Mounting flange 36 provides a means by which the pressure transducer can mount on the wall of an electronic control module. Inductor 30 is disposed within bore section 32 and for this purpose a single turn thread 38 is provided on the inside wall of bore section 32 to engage a mating thread on the inductor. The single turn thread 38 is made discontinuous (see FIGS. 5 and 6) to provide for molding of the entire housing element from a plastic material.

The right hand housing element 24 comprises a circular cylindrically walled bore section 40, a right hand closure wall 42, and an inlet port 44 in wall 42. Element 24, like element 22, is preferably made of plastic. The bore sections 40 and 34 of the respective elements are dimensioned to mutually interfit. Bore section 40 has a grooved lip containing a sealing gasket 46 which provides sealing contact of the outer periphery of the bore wall with the inner periphery of the wall of bore section 34. As will be seen in the ensuing description, the provision of the mutually interfitting wall sections 34 and 40 allows the two housing elements to be rotated with respect to each other, and this capability is employed to perform adjustment toward obtaining the desired span in the assembled transducer.

Pressure responsive device 26 comprises a conventional bellows 48 and a fitting 50. The otherwise open right hand end of bellows 48 is closed with the edge of the opening wrapped around a circular flange 52 on fitting 50 after the left hand segment of the fitting has been inserted into the interior of the bellows. The right hand end of fitting 50 contains a screw thread 54 and the bellows and fitting are assembled into the transducer by inserting thread 54 through a suitable aperture in the right end wall 56a of a base plate 56 and then threading a nut 58 onto the thread and tightening it to draw flange 52 securely against end wall 56a. The fitting further includes a portion 60 to the left of flange 52 providing an internal stop which limits the amount of longitudinal contraction of bellows 48 when the left hand end wall of the bellows abuts the left hand end of the fitting. It is desirable to limit the amount of collapse of the bellows to avoid overstressing of the bellows convolutions. Fitting 50 includes a throughbore 62 via which the interior of the bellows may be evacuated. Once the desired degree of evacuation has been obtained, the bore is closed by lodging a suitable sealing plug 64 into its open right hand end. A spring seat 66, secured to the left-hand end wall of bellows 48, as by soldering, cooperates with base plate 56 to hold a helical compression spring 68 in compression. The spring force tends to bias bellows 48 axially toward expansion. The spring is placed around the bellows prior to attachment of the bellows and fitting to base plate 56. A tab 70 is centrally turned outwardly at 90° from seat 66 and provides for contact with bent lever mechanism 28 by which motion of pressure responsive device 26 is transmitted to inductor 30.

Bent lever mechanism 28 comprises a member 72 forming a first lever arm, a member 74 forming a second lever arm, a hinge member 76, a hinge anchor 78, a hinge support 80 and several rivets 82, 84, 86. Hinge anchor 78 is formed integrally with base plate 56 and is disposed in a plane radial to the common axis of the interfitting bore sections 34, 40. An axial web of material 56d joins the hinge anchor with a radial flange 56c of base plate 56. Hinge member 76 is generally U-shaped (FIG. 9) and comprises a base 76a and two sides 76b, 76c. Base 76a, hinge anchor 78, and hinge support 80 possess the same general shape as well as registering apertures through which rivets 86 pass to securely hold the base of the hinge between the anchor and support. The hinge sides 76b, 76c project generally radially inwardly, and lever arm member 74 is secured to the distal ends of the hinge sides by rivets 84 passing through registering apertures in the two pieces.

As shown in FIG. 9, member 74 is of a somewhat annular shape having a segment of circular contour with a circumferential extent of about ¾ of a full circle. The remainder of member 74 is a generally straight segment containing a central recess 88. The base of the first lever arm member 72 is disposed against the wall of recess 88 and the two members are secured together by rivet 82 passing through suitable apertures in the recess wall and the member base. With this arrangement, the distal end of member 72 is disposed for contact with tab 70 and the circular segment of member 74 is disposed for contact with inductor 30.

Inductor 30 comprises an inductance coil 96 disposed on a plastic bobbin 98 having at its left hand end an enlarged threaded portion 100 via which the bobbin and coil assembly is screwed onto the single turn thread 38 during assembly. A pair of terminals 102 are secured in suitable sockets in the left hand end of the bobbin and project through the left hand end of bore section 32 to provide for external connection of the transducer in an electrical circuit. The end segments 104 of the wire forming coil 96 are brought out respectively through suitable axial slots 106 in the bobbin and are wrapped around and securely electrically joined to the respective terminals 102. Preferably a cylindrical conductive metal shield 108 is provided around coil 96 and includes a neck 108a at the right hand end thereof which fits closely around the right hand end of the bobbin. A longitudinal slot 108b (see FIG. 13) runs the full length of shield 108 including the neck. The bobbin includes a central circular bore 110 open only at the right hand end. A circular cylindrical tubular ferrite core 112 securely affixed to the shank of a plastic plunger 114 is inserted into the open right hand end of the bobbin bore, and can slide closely, but freely, without undue friction or binding, within bore 110. Plunger 114 has an enlarged head 116 at its right hand end, and the core is securely retained between it and a bead 118 at the left end of the shank which is formed ultrasonicly after core 112 has been slid on. An annular spring seat 120 is disposed over the right hand ends of the shield and bobbin. A compression spring 122 is retained in compression between seat 120 and head 116 of plunger 114 so that the head of the plunger is biased into engagement with the circular segment of lever arm member 74 with the spring seat 120 bearing against a suitable shoulder on the wall of bore section 32. Preferably the plunger head includes a smoothly contoured button for contact with the lever arm member 74. The finished transducer has the left hand end of bore 32 sealed and closed by means of a suitable potting material 124. A series of integral stiffing ribs 126 can be used to rigidify the housing structure. The inductor provides a variable inductance between terminals 102 as a function of the axial position of the core 112 relative to coil 96.

Operation of transducer 20 can be best understood from consideration of FIG. 1. Pressure being sensed is communicated to the interior of the housing via port 44. If bellows 48 expands in length in response to a reduction in sensed pressure, the bellows motion, acting on the first lever arm member 72, causes the bent lever mechanism to pivot in the counterclockwise direction. The pivotal motion is the result of flexing of the two sides 76b, 76c of hinge member 76, the two lever arm members being sufficiently stiff themselves, relative to the hinge, to preclude deflection between them. As a consequence of the pivotal motion, member 74 shifts plunger 114 to the left, inserting core 112 more fully into bore 110.

On the other hand should there be an increase in sensed pressure, resulting in contraction of the bellows, the spring force exerted by spring 122 will act via plunger 112 to pivot the bent lever mechanism in the clockwise direction, maintaining member 72 in contact with tab 70. The corresponding shift of the core to the right results in partial withdrawal from bore 110. In this manner, motion is transmitted between pressure responsive device 26 and inductor 30 by bent lever mechanism 28 to create a correlation between sensed pressure and inductance.

With the foregoing description in mind, the reader is directed to consider the calibration feature of the present invention. The significance of the relative rotational capability of the two bore sections 34, 40 was alluded to earlier. However, it was not at that time pointed out that base plate 56 is secured to rotate with housing element 24. Such attachment is accomplished by a set of locating apertures in flange 56c (see FIG. 7) and a like pattern of locating pins 92 integrally formed in housing element 24. Prior to assembly of base plate 56 to housing element 24, pins 92 can pass freely through the apertures. After the base plate is placed on housing element 24 with the pins passing through the apertures, the distal ends of the pins may be ultrasonicly deformed into beads to secure hold the base plate in place against lands 94 on the housing element from which the pins extend. The base plate may contain a further aperture in flange 56c to promote free communication of the port to the interior of the housing. Now, if housing element 24 is rotated relative to housing element 22, base plate 56 and the bent lever mechanism 28 rotate with element 24 relative to element 22. Because pressure responsive device 26 is secured to base plate 56, there is no relative change between it and mechanism 28. However, a change occurs between mechanism 28 and inductor 30, and can be understood from consideration of FIGS. 9 and 10.

In the FIG. 9 position, bent lever mechanism 28 has a mechanical advantage defined by respective effective lever arms A (associated with member 72) and B (associated with member 74). The ratio A:B is 1:2.

The FIG. 10 position illustrates a relative rotation between the two housing elements of 45° from the FIG. 9 position. In this new position, the effective lever arm A remains the same, but that associated with member 74 has been reduced to B' so that the ratio A to B' is greater than the 1:2 ratio of A:B. Thus, relative rotation of the housing elements serves to adjust the mechanical advantage of the bent lever mechanism, and in turn the span (i.e. slope or gain) of transducer 20. The reason for the circular contoured segment of member 74 should now be apparent: it allows maintenance of contact with the plunger head as the housing elements are rotated. The illustrated embodiment contemplates a 90° range of adjustment in either direction. Thus, it can be seen that adjustment on either side from the FIG. 9 position is symmetrical. Although there is no limit stop to limit mechanically circumferential rotation between the two housing elements, the calibration procedure should avoid exceeding the 90° symmetrical range so that the plunger head does not come off the surface of member 74 where it might possibly hang up. In order to accurately axially locate the two interfitting bore sections 34, 40, the right hand ends of the integral structural stiffening ribs 126 can be used to form an axial stop setting the amount of insertion of bore section 40 into bore section 34. The rounded button on plunger head 116 and the rounded tip on tab 70 minimize friction and scuffing with the lever arms during adjustment and operation of the pressure transducer.

Temperature compensation is accomplished internally of the transducer in two ways. First, temperature-caused changes in Young's Modulus of the materials of spring 68 and bellows 48 are compensated by back-filling of the bellows. In the present embodiment this is done by evacuating the bellows to a suitable value, approximately ½ inch Hg absolute, for example. Second, temperature-caused changes in the longitudinal dimension of the housing (which give rise to changes in the relative longitudinal positions of the inductor and bellows) are compensated by making lever arm member 72 of a bimetal strip. The strip, at its point of contact with tab 70, deflects, in response to temperature change, in an amount approximating the temperature-caused change in relative positions of the inductor and bellows. In use, the pressure which is communicated by port 44 to the interior of the transducer may also drop to very low pressures relative to the outside atmospheric pressure. It may therefore be desirable to rigidify the housing structure, for example by means of the stiffening ribs described above, to preclude structural deflections which could change the relative positions of the bellows and inductors.

The preferred assembly and calibration of transducer 20 is as follows:

For housing element 22, bobbin 100 is threaded into bore section 32. Since the plunger and core assembly, spring 122, and spring seat 120 are separate pieces, they may be assembled after the bobbin. For housing element 24, the bellows, fitting 50 and spring 68 are first secured to base plate 56. The bent lever mechanism 28 is then assembled to the base plate. This entire assembly is next assembled into housing element 24. The two housing elements are now assembled by inserting bore section 40 of element 24 within bore section 32 of element 22 until the left end of bore section 40 abuts the axial stop provided by the stiffening ribs of element 22.

At this stage of assembly bore bobbin 100 may be adjusted axially within bore section 32 by means of the threaded connection because the potting material 124 has not yet been introduced. The mechanical advantage of the bent lever mechanism may also be adjusted by relative rotation of the two housing elements since they have not yet been locked together. The set point of the transducer is established by adjusting bobbin 100. The set point and span calibration may now be performed. The preferred calibration involves first initially calibrating the set point, then calibrating the span, and a final readjustment of the set point, if needed.

The set point may be calibrated with the aid of a calibration tool 200 shown in FIG. 14. Tool 200 comprises a cylindrical sleeve 202 open at the right hand end to fit closely over bore section 32 of the housing. An adjustment element 204 has a spindle 206 which engages a slot 100a in the left hand end of bobbin 98 when sleeve 202 is engaged with bore section 32. Spindle 206 projects from the body 208 of element 204 with the body 208 having close fit with the sleeve 202. A head 210 is provided to facilitate rotation of member 204 within sleeve 202 and in turn rotate the bobbin within the threaded housing bore. The tool further contains a pair of spring-loaded terminals 212 which contact terminals 102 when the tool is engaged with the transducer. Lead wires 214 from the respective terminals 212 provide for connection with appropriate external calibration circuitry (not shown) to provide a measurement of the inductance across terminals 102. As shown in the drawing, the tool is suitably sealed to provide a vacuum seal for the still unpotted left-hand end of the transducer while the bobbin is being adjusted. Vacuum is introduced into sleeve 202 between the member 204 and the transducer by means of a port 216 connected to a vacuum source. The same vacuum is applied to port 44 and the tool is operated to position the coil and bobbin axially of the transducer housing to produce a desired indication of inductance on the external calibration circuitry. This completes the initial set point adjustment, (i.e. offset adjustment).

Next, the span adjustment is performed by appropriate relative rotation of the two housing elements and reading the external circuitry at suitable vacuum levels until the correct mechanical advantage which will produce the desired span (i.e., slope of inductance vs. pressure) is obtained. This completes the span adjustment.

Next, the set point is rechecked by the same procedure as initially performed, and if there has been any change, it is readjusted to the desired setting. This completes the calibration procedure. Once the desired calibration has been obtained the potting material is introduced to seal bore 32 and the two housing elements are secured in the established relative rotational position by a suitable means such as ultrasonic welding, cement and/or mechanical fasteners. The O-ring seal is preferably lubricated with a suitable substance to minimize the rotational friction between the two bore sections 32 and 40 when the two housing elements are rotated to perform the span adjustment. A possible source of interaction between the set point and span calibrations is that the second lever arm member 74 may not be truly square when the span calibration is being made. If this is the case, then performance of the span calibration may change the initial set point calibration, requiring subsequent re-adjustment of the set point. It may be possible to avoid having to subsequently readjust the set point by performing a simple adjustment on the combined base plate, lever mechanism, and bellows sub-assembly before same is assembled into housing element 24. This involves placing the sub-assembly in a suitable fixture with the lever mechanism biased into engagement with tab 70. If the angularity of member 74 is incorrect, it may be corrected by merely bending tab 70 in an amount which brings the lever mechanism to the correct angularity.

Among the advantages of the invention are that calibration and set point adjustments may be performed conveniently on a mass production basis while attaining a sufficient degree of accuracy and linearity. The construction of the transducer is considerably more cost effective for its preferred application that commercial transducers of which applicants are aware. The shielding of the coil minimizes the sensitivity to stray magnetic fields. The neck which is provided on the shield serves to improve the linearity of inductance vs. core travel. The slot 108b improves the Q of the inductor which is beneficial in the preferred circuit usage hereinafter described. The sensitivity of the inductor with the shield is improved 30% or more over that without the shield. By way of example, the preferred embodiment of coil comprises 2400 turns of #36 wire and a ferrite core 0.180 inches diameter by 1 inch long and can provide a good linearity over about 0.200 inches travel. Furthermore, it will be noted that no internal electronic components are required.

Figure 12:
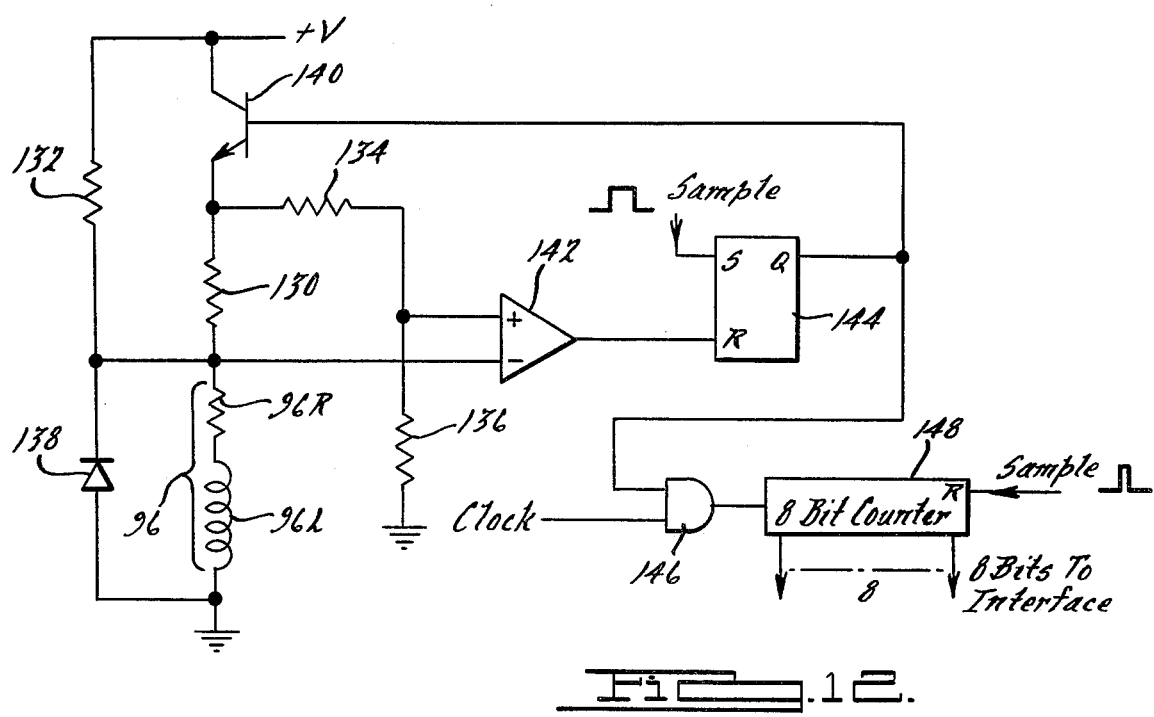
FIG. 12 is an electrical schematic diagram illustrating the transducer of the present invention connected in an electronic circuit.

FIG. 12 illustrates a preferred electronic circuit with which the transducer may be used. The circuit comprises resistors 130, 132, 134, 136, a diode 138, a transistor 140, a comparator 142, a flip-flop 144, an AND gate 146 and an eight-bit counter 148, all connected schematically as illustrated. The coil 96 is schematically shown as comprising inductance 96L and internal resistance 96R.

The circuit operates as follows: When a sample pulse is applied to the flip-flop 144 the Q output goes high rendering the transistor 140 conductive. Prior to conduction of the transistor inductance coil 96 is de-energized. Upon transistor conduction, the supply voltage (less the collector-emitter drop across transistor 140) is impressed across resistor 130 and inductance coil 96. This same voltage is also impressed across resistors 134, 136. The voltage at the junction of resistors 134, 136 is supplied to the noninverting input of comparator 144 thereby establishing a reference for the comparator.

The junction of resistor 130 and inductance coil 96 is connected to the inverting input of comparator 142. Because the inductance coil is initially de-energized, the impressed voltage creates an electrical transient tending to charge the coil thereby causing a transient voltage to be supplied to the noninverting input of the comparator. The transient waveform is a decaying exponential. When the transient passes through the reference, comparator 142 switches to reset flip-flop 144 thereby causing the Q output signal to go low. Thus, from the time of occurrence of the sample pulse to the flip-flop until the flip-flop is reset, the Q output of the flip-flop is high. Because the duration of the transient is a function of the RL time constant, it will be appreciated that the duration of the transient is a function of the inductance of coil 96 and in turn an indication of the pressure sensed by transducer 20. Therefore, by utilizing the Q output of the flip-flop to gate a constant frequency clock to counter 148, the count in counter 148 is also representative of sensed pressure. Thus, the output of the count provides a digital signal representing sensed pressure.

Upon the Q output of flip-flop 144 becoming low again, transistor 140 is rendered nonconductive terminating the charging transient of the RL circuit. The energy stored in inductance coil 96 now dissipates through diode 138. Occurrence of the next sample pulse to the flip-flop will initiate another cycle to update the output of counter 148. The clock signal and the two sample signals may be supplied from conventional circuits which are not shown. The purpose of resistor 132 is to supply a bias to comparator 142 to avoid toggling of the comparator when transducer 140 is not conducting. By appropriate selection of resistance and inductance values in conjunction with the transducer characteristics, the digital word output of counter 148 may be made to be the binary value of sensed pressure in pertinent units of pressure. This allows the signal to be directly used by the digital microprocessor of the associated control system. It is contemplated that the circuitry shown in FIG. 12 would be integrated into a microcircuit device associated with the microprocessor, such as an input-output microcircuit.

Thus, there has been shown and described a new and unique pressure transducer well suited for use in mass production of engine control systems where manifold absolute pressure is required to be sensed.

What is claimed is:

1. In a pressure transducer comprising:
    a pressure responsive device providing motion in response to sensed pressure variations;
    an electromechanical device comprising two elements which are relatively positionable, wherein one of said elements is an electric circuit element which provides an electrical circuit characteristic whose value corresponds to the relative positioning of said two elements; and
    means operatively coupling said two devices such that the motion of said pressure responsive device in response to sensed pressure variations correspondingly relatively positions said two elements, said coupling means comprising first lever arm means, second lever arm means, pivot means providing a pivot for said two lever arm means coupling pivotal motion of each lever arm means to the other, and means mounting said coupling means relative to said two devices for selective positioning over a range of positions establishing a range of mechanical advantages by which said two lever arm means couple said two devices whereby said coupling means may be positioned to secure that mechanical advantage which creates a desired calibration between said two devices;
    the improvement wherein the two elements of said electromechanical device are relatively positionable along an axis, said pressure reponsive device provides motion along another axis which is parallel to but spaced from said first-mentioned axis, and said mounting means is selectively positionable in a circular direction around and concentric with said another axis.

2. A pressure transducer as set forth in claim 1 wherein one of said lever arm means comprises a temperature responsive bimetal which compensates for temperature induced changes in calibration of the pressure transducer.

3. A pressure transducer as set forth in claim 1 wherein said electromechanical device comprises a variable inductor.

4. A pressure transducer comprising:
    a housing comprising two housing elements having mutually interfitting circular cylindrical bore sections which may be rotated relative to each other about a common axis;
    an electromechanical device mounted on said housing comprising two elements which are relatively positionable along an axis wherein one of said two elements is an electric circuit element which provides an electrical circuit characteristic whose value corresponds to the relative positioning of said two elements;
    a pressure responsive device whose axial length is a function of pressure differential acting thereon and which is mounted on said housing with its axis eccentric relative to the axis of said electromechanical device;
    means operatively coupling said two devices such that changes in the axial length of said pressure responsive device in response to changes in pressure differential acting thereon selectively relatively positions said two elements; and
    means mounting said coupling means for rotation with one of said bore sections for selectively establishing a desired ratio between change in the axial length of the pressure responsive device in response to changes in pressure differential acting thereon and resultant change in relative positioning of said two elements.

5. A pressure transducer as set forth in claim 4 wherein one device is mounted on one housing element and the other device on the other housing element.

6. A pressure transducer as claimed in claim 4 wherein said coupling means comprises a bent lever mechanism whose mechanical advantage is a function of relative rotation of said bore sections.

7. A pressure transducer as set forth in claim 4 wherein said electromechanical device comprises a variable inductor having a coil and a core which are relatively positionable along the axis thereof and incuding a metal shield around said core, said shield having a neck portion at one end thereof and including a slot extending the full length of the shield.

* * * * *